United States Patent [19]
LaBelle

[11] Patent Number: 6,026,773
[45] Date of Patent: *Feb. 22, 2000

[54] ANTITHEFT INTERRUPT SYSTEM FOR VEHICLE STARTER POWER CIRCUIT

[75] Inventor: James L. LaBelle, Murrieta, Calif.

[73] Assignee: Labken, Inc., San Marcos, Calif.

[ * ] Notice: This patent is subject to a terminal disclaimer.

[21] Appl. No.: 09/020,585

[22] Filed: Feb. 2, 1998

Related U.S. Application Data

[63] Continuation-in-part of application No. 08/680,779, Jul. 16, 1996, Pat. No. 5,713,321, which is a continuation of application No. 08/577,977, Oct. 15, 1996, Pat. No. 5,564,376.

[51] Int. Cl.[7] .............................. B60R 25/04; F02N 11/08
[52] U.S. Cl. .................... 123/179.3; 290/38 R; 307/10.3
[58] Field of Search .............................. 123/179.2, 179.3, 123/179.25; 307/10.3, 10.4, 10.5; 180/287; 290/38 R

[56] References Cited

U.S. PATENT DOCUMENTS

| | | | |
|---|---|---|---|
| 3,492,494 | 1/1970 | Clark et al. | 307/10.5 |
| 3,749,930 | 7/1973 | Roe | 307/10.5 |
| 4,141,332 | 2/1979 | Wyler | 123/179.2 |
| 4,209,709 | 6/1980 | Betton | 307/10.4 |
| 4,288,778 | 9/1981 | Zucker | 307/10.5 |
| 4,315,160 | 2/1982 | Levine | 307/10.3 |
| 4,533,016 | 8/1985 | Betton | 307/10.4 |
| 4,545,343 | 10/1985 | Cook et al. | 123/198 B |
| 4,607,312 | 8/1986 | Barreto-Mercado | 361/172 |
| 4,733,638 | 3/1988 | Anderson | 123/198 B |
| 4,896,637 | 1/1990 | Yamamoto | 123/179.3 |
| 5,079,436 | 1/1992 | Elkins | 307/10.3 |
| 5,191,228 | 3/1993 | Sloan | 307/10.3 |
| 5,224,567 | 7/1993 | Tomlinson | 180/287 |
| 5,381,128 | 1/1995 | Kaplan | 340/426 |
| 5,453,730 | 9/1995 | De-Grinis et al. | 307/10.3 |
| 5,513,105 | 4/1996 | Krones | 307/10.5 |
| 5,564,376 | 10/1996 | Labelle et al. | 123/179.3 |
| 5,635,916 | 6/1997 | Bucholtz et al. | 307/10.3 |
| 5,742,137 | 4/1998 | Bratton et al. | 123/179.3 |

FOREIGN PATENT DOCUMENTS

81/03002 10/1981 WIPO ............................. B60R 25/04

Primary Examiner—Andrew M. Dolinar
Attorney, Agent, or Firm—John L. Rogitz

[57] ABSTRACT

A vehicle antitheft system includes a housing that is supported by the vehicle's starting current power line between the vehicle's battery and the vehicle's starter motor. The starting current power line is cut, and one end of the line is advanced into an input channel that is established by an input bus bar in the housing. The other end of the line is advanced into an output channel that is established by an output bus bar in the housing. Plural MOSFETs are in electrical contact with the bus bars, and a control circuit controls the MOSFETs in response to a remotely generated rf enable signal. Consequently, the vehicle can be started by turning the ignition switch only after receipt of the enable signal. The starting current power line is held in the channels by set screws.

35 Claims, 8 Drawing Sheets

Fig. 11 POWER SWITCH CIRCUIT
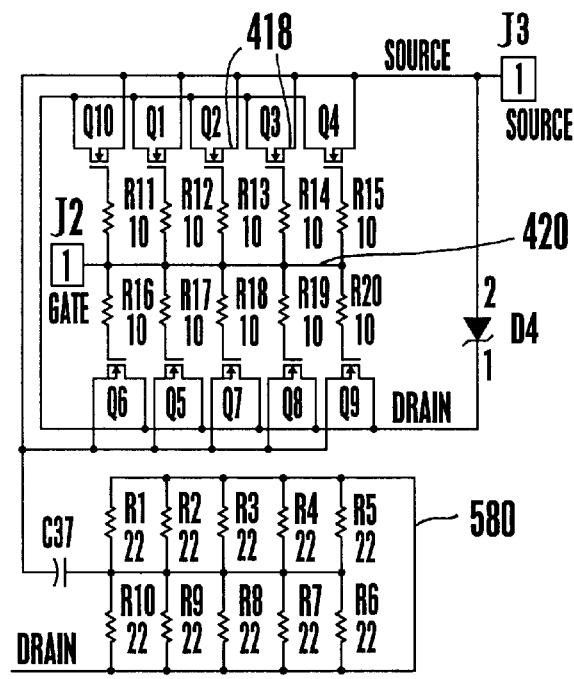
Fig. 12 ELECTRONIC POWER SUPPLY CIRCUIT
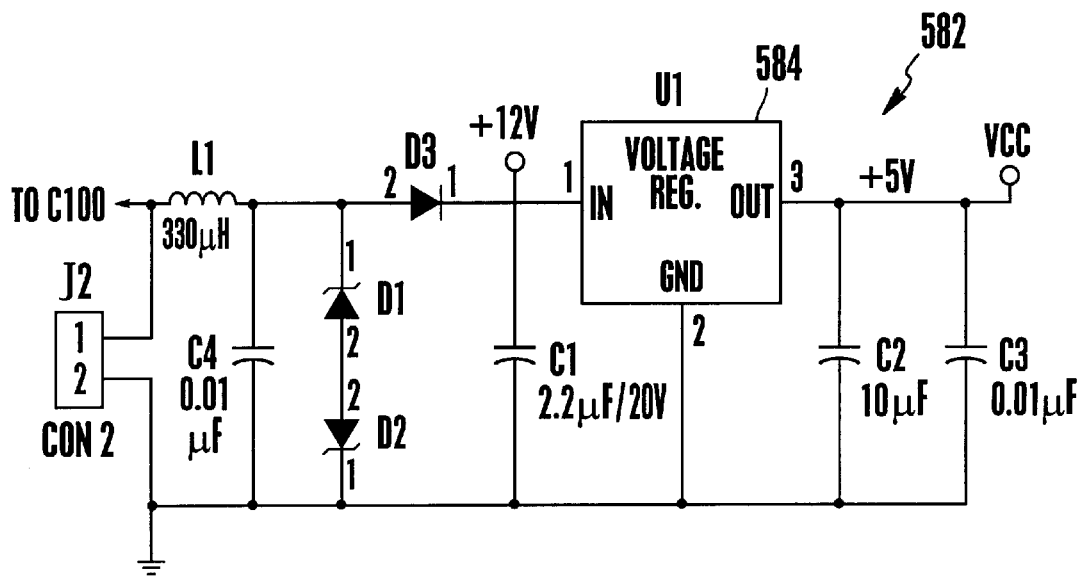

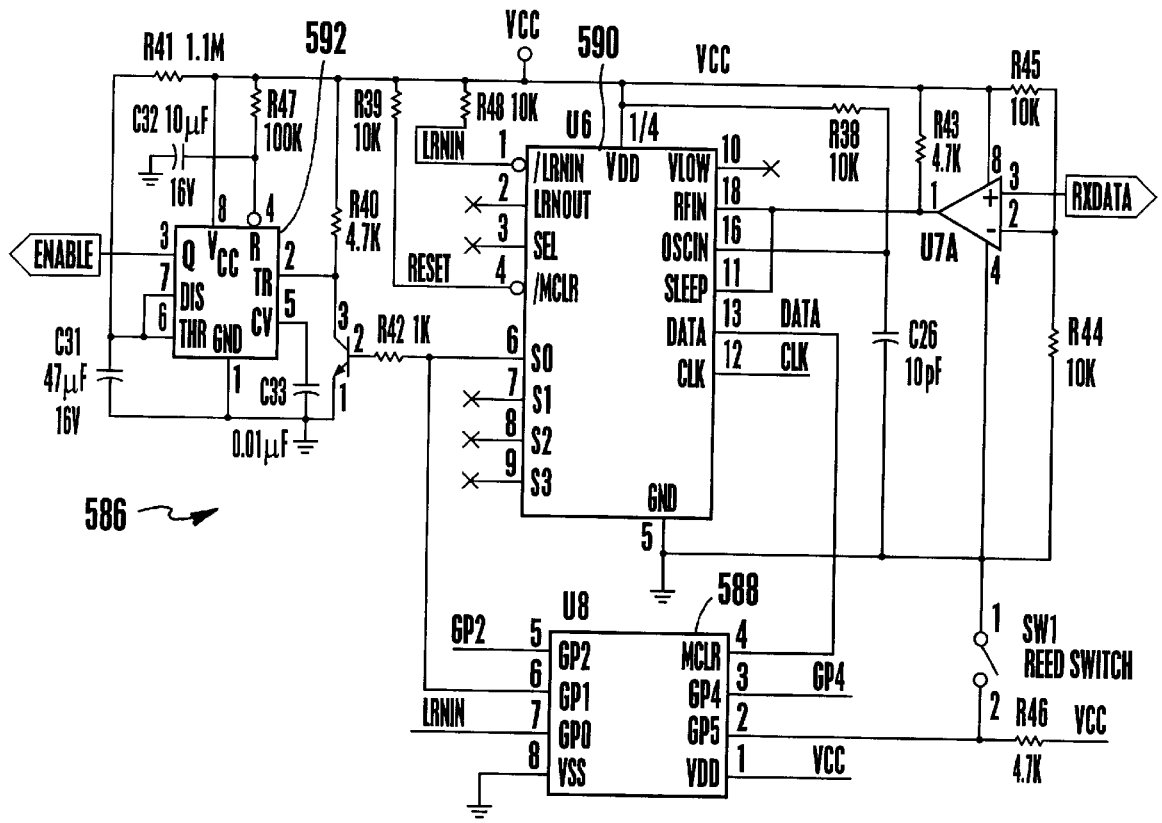
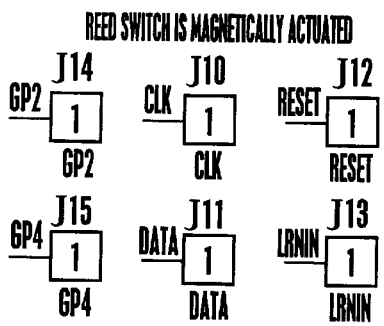
Fig. 13
CONTROL CIRCUIT

GATE CONTROL CIRCUIT

ANTITHEFT INTERRUPT SYSTEM FOR VEHICLE STARTER POWER CIRCUIT

RELATED APPLICATIONS

The present application is a continuation-in-part of and claims priority from allowed U.S. patent application Ser. No. 08/680,779 for an invention entitled "Antitheft Interrupt System for Vehicle Starter Power Circuit" filed Jul. 16, 1996, now U.S. Pat. No. 5,713,321, which is a continuation of U.S. patent application Ser. No. 08/577,977, filed Oct. 15, 1996, now U.S. Pat. No. 5,564,376, said co-pending application being assigned to the same assignee as the present invention, and incorporated herein by reference.

FIELD OF THE INVENTION

The present invention relates generally to vehicles, and more particularly to override-resistant vehicle antitheft systems.

BACKGROUND

Vehicle antitheft systems have been provided that function by disabling a component in the ignition system of a vehicle unless a security code is transmitted to the system prior to starting the vehicle. An example of such a device is disclosed in U.S. Pat. No. 4,733,638 to Anderson, which discloses a transmitting device that can be manually operated to energize a relay within the casing of a vehicle starter motor. In turn, the relay, once energized, closes an auxiliary contact that is also located in the casing of the starter motor to thereby complete the electrical path from the vehicle's battery to a conventional starter solenoid. In accordance with well-known principles, when the ignition key is rotated to close the ignition switch, the starter solenoid both engages the Bendix gear of the starter with the vehicle flywheel, and closes a conventional starter switch to complete the electrical path between the battery and the starter motor to turn the Bendix gear and flywheel, thereby starting the vehicle.

Accordingly, the Anderson device, like many if not most such antitheft systems, does not directly control power to a starter motor, but rather indirectly controls power to the starter motor by controlling power to the starter solenoid. A principal reason why power to the solenoid is controlled is that the electrical current drawn by the solenoid is much less than the current drawn by the starter motor, thus permitting the use of relatively small, inexpensive auxiliary contacts by the antitheft systems.

While somewhat effective, existing antitheft systems have certain drawbacks. For example, because many of its components are located within the casing of the starter motor, the Anderson device mentioned above cannot be easily integrated with existing starter motors. Further, from the above discussion it will be appreciated that the Anderson device is intended for use with ignition systems wherein the solenoid is housed with the starter motor. Indeed, the Anderson device cannot be used in conjunction with ignition systems wherein the solenoid is not co-housed with the starter motor.

Unfortunately, antitheft systems which can disable a starter solenoid that is housed apart from the starter motor are relatively easy to defeat. This is because the solenoid is typically mounted in a location on the vehicle that relatively easy to access, compared to accessing the starter motor, and requires the jumpering of a relatively small amount of current, compared to the current that must be jumpered to defeat a circuit element in the main power line to the starter motor. As accordingly recognized by the present invention, it would be advantageous to provide a vehicle antitheft system which can be easily and quickly mounted in a comparatively inaccessible location, i.e., on the starter motor casing, which is difficult to defeat by jumpering, and which can be used in conjunction with existing stock starter motors.

It is therefore an object of the present invention to provide a vehicle antitheft system that can be used in conjunction with existing starter motors. Another object of the present invention is to provide a vehicle antitheft system that can be easily and quickly mounted on the starter motor casing of a vehicle. Yet another object of the present invention is to provide a vehicle antitheft system that is relatively difficult to defeat by jumpering. Still another object of the present invention is to provide a vehicle antitheft system that interrupts power to the starter motor of a vehicle, unless an enable signal is transmitted to the vehicle. Another object of the present invention is to provide a vehicle antitheft system that is easy to use and cost-effective.

SUMMARY OF THE INVENTION

This invention concerns a vehicle antitheft system that is actuated by a portable signal generator, preferably an rf transmitter, and that is connected to the starter motor of a vehicle for selectively interrupting the starting current power line between the battery and the starter motor.

The starter motor includes starter motor windings, a casing, and a power terminal electrically coupled to the starter motor windings. In accordance with the present invention, the antitheft system includes a housing that is connectable to the casing of the starter motor via a rigid adapter or by means of mounting the housing on the battery cable in electrical series therewith, near the starter motor. A battery connector is configured for engaging the power line, and a starter connector is configured for engaging the power terminal of the starter motor. A power switch, preferably a solid state device such as a silicon controlled rectifier (SCR) or one or more MOSFETs, is disposed in the housing in electrical series between the battery connector and starter connector. Per the present invention, a control circuit is electrically connected to the power switch, and the control circuit is responsive to an enable signal to close the power switch upon receipt of the enable signal.

In the preferred embodiment, the antitheft system includes a portable enable signal generator for generating the enable signal. Also, the preferred control circuit includes a time delay circuit for causing the SCR to open when a predetermined period after receipt of the enable signal has elapsed. Moreover, the control signal includes an audible alarm, and the control circuit activates the audible alarm during the predetermined period.

In another aspect of the present invention, an antitheft system for completing an electrical path between a vehicle battery power line and a vehicle starter motor upon receipt of an enable signal includes an enable signal generator for generating the enable signal. Moreover, the antitheft system includes a power switch which is juxtaposed with the starter motor and which is connected in series between the battery power line and the starter motor. A control circuit receives the enable signal and closes the power switch in response thereto.

In still another aspect of the present invention, a method is disclosed for electrically connecting a battery to a power terminal of a starter motor of a motor vehicle. The present method includes disposing a power switch and a control circuit for controlling the power switch in a housing, and mounting the housing in juxtaposition with the starter motor. Both the battery and starter motor are then electrically connected to the power switch. An enable signal is transmitted to cause the control circuit to close the power switch.

An antitheft device is disclosed for a vehicle including a battery, a starter motor including windings, and a starting current power line establishing at least a portion of an electrically conductive path between the battery and the starter motor windings. The device includes a housing supported by the starting current power line and a power switch in the housing in series with the electrically conductive path, the power switch closing in response to an enable signal.

In a preferred embodiment, the power switch is at least one MOSFET, and the device includes an electrically conductive input bus bar internal to the housing in electrical contact with the at least one MOSFET. The input bus bar is formed with an input channel for receiving an input segment of the power line therein, with the input segment being associated with the battery. Further, at least one input retaining screw is engaged with the input bus bar for protruding into the input channel to thereby hold the input segment in the input channel. Additionally, an electrically conductive output bus bar is internal to the housing in electrical communication with the at least one MOSFET, and the output bus bar is formed with an output channel for receiving an output segment of the power line therein. The output segment is associated with the starter motor windings. At least one output retaining screw is engaged with the output bus bar for protruding into the output channel to thereby hold the output segment in the output channel. In addition, an electrically conductive trace can be in electrical contact with the at least one MOSFET and the output bus bar.

Preferably, a receiver receives the enable signal. In a preferred embodiment, the receiver is associated with a noise suppression and adaptive slicer circuit for improving the operational range of the receiver.

In another aspect of the alternate embodiment, a method is disclosed for electrically connecting a battery to a starter motor of a motor vehicle having a starting current power line. The method includes disposing a power switch in a housing and cutting the starting current power line to establish an input segment and an output segment. Also, the method includes advancing the segments into the housing to support the housing, such that the segments are in electrical contact with the power switch. An enable signal is then transmitted to cause the power switch to close.

In yet another aspect of the alternate embodiment, a computer program device includes a computer program storage device readable by a digital processing apparatus and a program means on the program storage device and including instructions executable by the digital processing apparatus for performing method steps for operating a power switch in a vehicle antitheft device in response to an enable signal. The method steps undertaken by the instructions include, upon at least one energization of the antitheft device, receiving at least one enable code from an enable code generator. Upon subsequent receipt of the at least one enable code within a predetermined time period, the method undertaken by the programmed instructions on the program storage device includes recording the at least one enable code as an authorized enable signal, and then closing the power switch upon subsequent receipt of an authorized enable signal.

In another aspect of the alternate embodiment, an antitheft device is disclosed for a vehicle including an ignition switch, a battery, a starter motor, a starter solenoid for establishing a pathway for starting current from the battery to the starter motor when the ignition switch is closed, and a control power line connected to the starter solenoid. The antitheft device includes a housing supported by the control power line, and a power switch in the housing. In accordance with the present invention, the power switch is in series with the control power line and is responsive to an enable signal to selectively close.

In another embodiment of the present invention, a starter solenoid includes a solenoid housing and an activating coil in the housing. In the present solenoid, the activating coil has an input terminal for receiving control current thereat. A solenoid contact is operable by the activating coil, and a power switch is in electrical series with the input terminal of the activating coil for actuating the solenoid upon receipt of an enable signal.

The details of the present invention, both as to its structure and operation, can best be understood in reference to the accompanying drawings, in which like reference numerals refer to like parts, and in which:

BRIEF DESCRIPTION OF THE DRAWINGS

FIG. 11 is an electrical schematic diagram of the power switches shown in FIG. 6;

FIG. 12 is an electrical schematic diagram of the power supply circuit for the electronic components of the device shown in FIG. 6;

FIG. 13 is an electrical schematic diagram of the control circuit for the device shown in FIG. 6;

DETAILED DESCRIPTION OF THE PREFERRED EMBODIMENT

Figure 1:
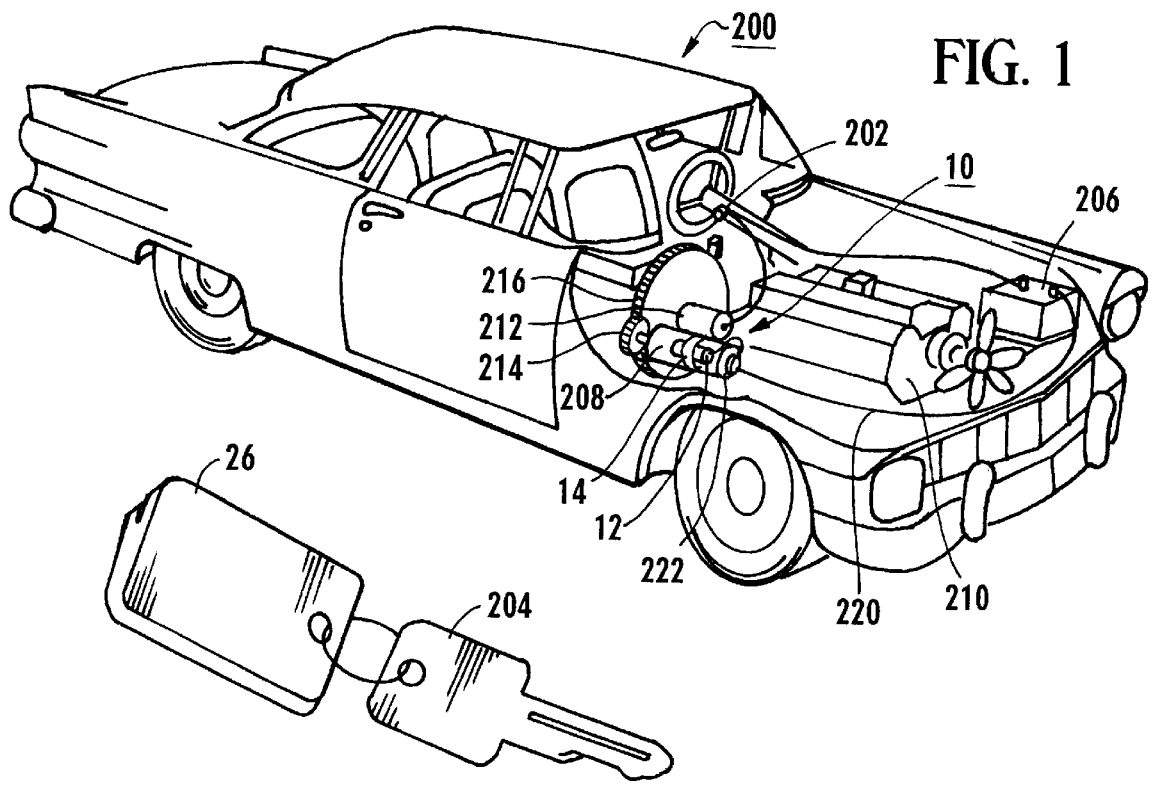
FIG. 1 is a perspective view of the antitheft system of the present invention, shown in its intended environment, with portions cut away for clarity.

Referring initially to FIG. 1, the intended environment of the present invention can be seen. A motor vehicle, generally designated 200, includes an ignition switch 202 that can be closed by means of a key 204 to complete the electrical path between a battery 206 and a starter motor 208 and thereby start the engine 210 of the vehicle 200. Specifically, in a conventional ignition system, when the ignition switch 202 is closed, a starter solenoid 212 is electrically connected to the battery 206, energizing the solenoid 212. In turn, the solenoid 212 engages a so-called Bendix gear 214 with the flywheel 216 of the vehicle 200. Also, in a conventional ignition system the solenoid 212 closes a starter switch 218 (FIG. 2) in a starting current power line 220 to complete the electrical circuit between the battery 206 and the starter motor 208. Thereby, the starter motor 208, which is coupled to the Bendix gear 214, is caused to rotate the Bendix gear 214 and, hence, the flywheel 216, starting the engine 210.

It will be appreciated that the current flowing through the starting current power line 220 must be relatively high to generate the torque necessary to turn the flywheel 216. The intention of the present invention is to interpose an antitheft system, which is responsive to a coded signal, in the starting current power line 220 between the battery 206 and the starter motor 208. Consequently, as the present invention recognizes, jumpering of the antitheft system is made difficult in that relatively high starting current must be jumpered to do so. Further, in the preferred embodiment the antitheft system of the present invention is physically juxtaposed with the starter motor 208, which is typically located in a location that is difficult to access. By "physically juxtaposed" is meant that the antitheft system is mounted on or within a few inches of the starter motor 208. Consequently, physically tampering with the present antitheft system is inhibited.

Figure 2:
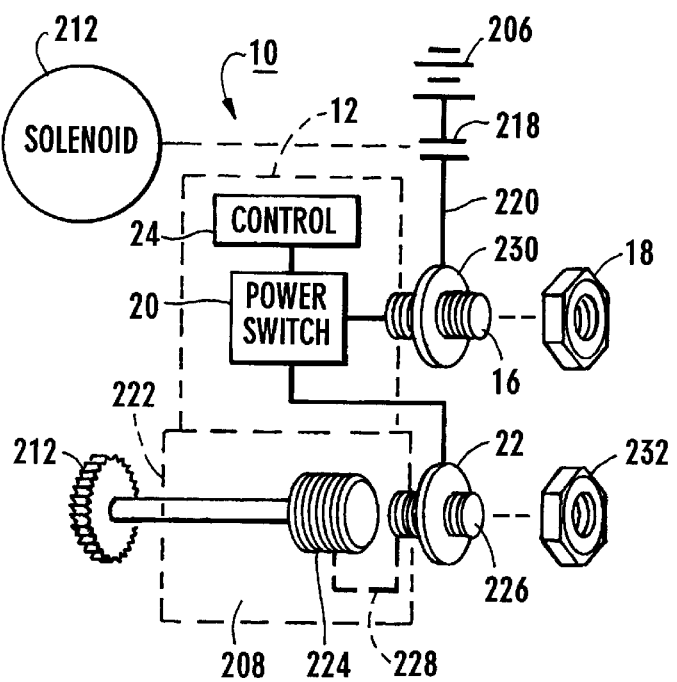
FIG. 2 is a partially schematic view of the antitheft system of the present invention, with portions shown in phantom.

With the above disclosure in mind, in cross-reference to FIGS. 1 and 2 an antitheft system, generally designated 10, includes a hollow plastic or metal housing 12 that is mounted on a casing 222 of the starter motor 208 by appropriate means. As but one example of how the housing 12 can be mounted on the starter motor casing 222, a bracket 222 (FIG. 1) is surroundingly engaged with the housing 12 and casing 222 to clamp the housing 12 against the casing 222.

Figure 3:
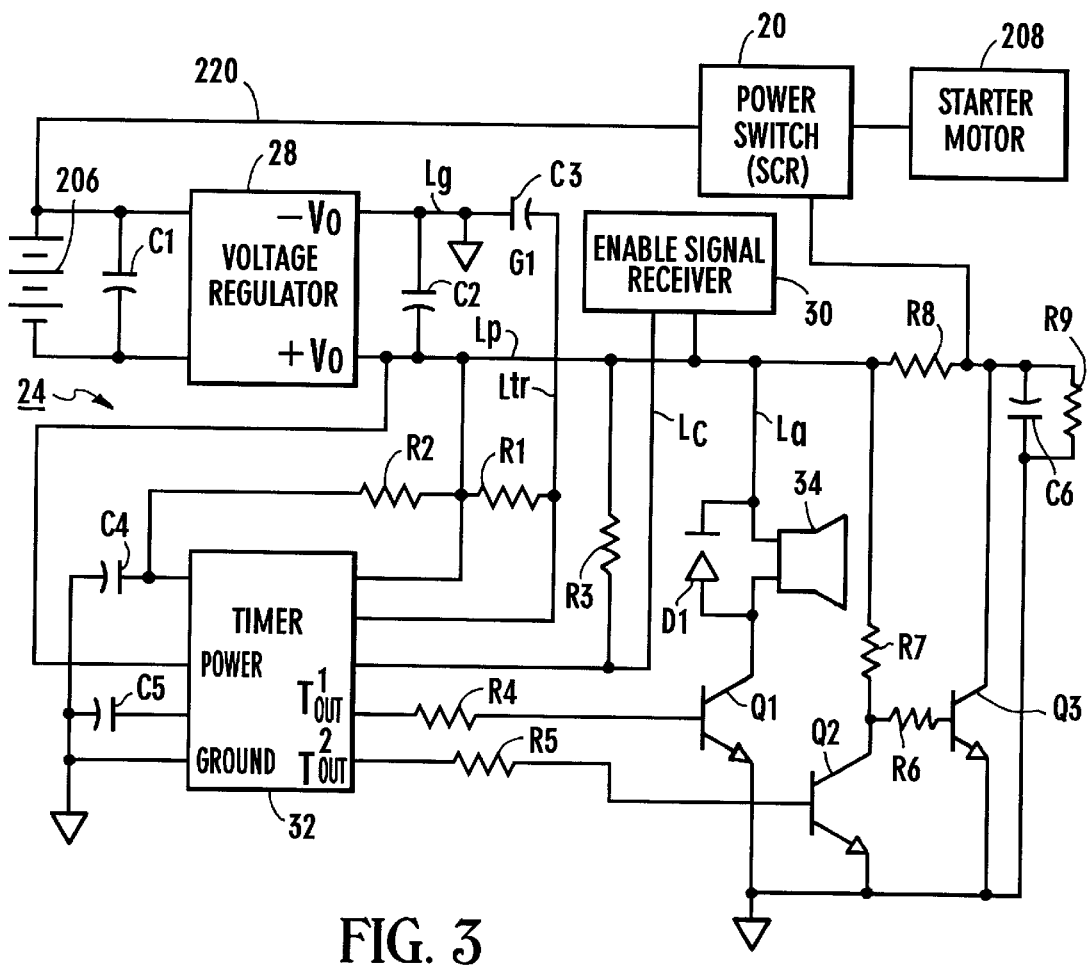
FIG. 3 is an electrical schematic view of the control circuit.
Figure 4:
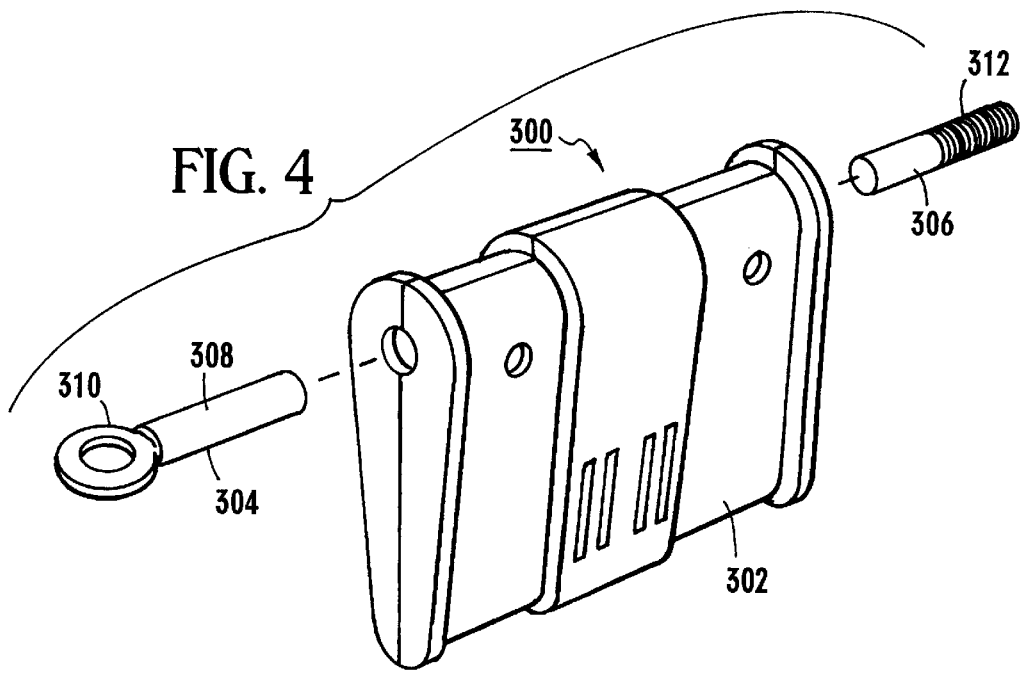
FIG. 4 is an exploded perspective view of the housing of the present invention with mounting adapters.

Alternatively, referring briefly to FIG. 4, an antitheft system, generally designated 300, includes a housing 302. The system 300 shown in FIG. 4 is in all essential respects identical in configuration and operation to the system 10 shown in FIGS. 1–3, except that the housing 302 can be juxtaposed with a starter motor casing by means of rigid metal mounting adapters 304, 306. More specifically, a starter/solenoid adapter 304 includes an elongate electrically conductive shank 308 that is in electrical contact with components within the housing 302 in accordance with principles discussed below, and the adapter 304 includes a hollow eye 310 on the end of the shank 308 that is opposed to the housing 302. It will readily be appreciated that the eye 310 can be fastened to a starter solenoid lug in electrical contact therewith, both to support the housing 302 and to effect electrical communication between the starter/solenoid and the components within the housing 302. Likewise, a rigid elongate electrically conductive battery adapter 306 is in electrical contact with components within the housing 302 in accordance with principles discussed below, and the adapter 306 includes a partially threaded end 312 that is opposed to the housing 302 for establishing a lug onto which a battery cable can be fastened, to further support the housing 302 and to effect electrical communication between the battery and the components within the housing 302.

Referring back to FIG. 2, the starter motor 208 includes windings 224 that are electrically coupled to an externally threaded power terminal 226, as indicated by the dashed line 228. The power terminal 226 extends outwardly from the casing. In accordance with well-known principles, the power terminal 226 establishes a means by which the battery 206 can be electrically connected to the starter motor 208 to energize the windings 224, thereby activating the starter motor 208 to turn the Bendix gear 212.

FIG. 2, however, shows that instead of connecting the starting current power line 220 directly to the power terminal 226 of the starter motor 208 as in a conventional ignition system, per the present invention the power line 220 is connected to an externally threaded terminal 16 of the antitheft system 10 by means of a battery connector 230. As can be appreciated in reference to FIG. 2, the battery connector 230 is held onto the terminal 16 in electrical contact therewith by a nut 18 that is threadably engaged with the terminal 16.

In turn, the terminal 16 is electrically connected to a power switch 20 that is disposed in the housing 12. Additionally, FIG. 2 shows that the power switch 20 is electrically connected to a starter connector 22. As can be appreciated in reference to FIG. 2, the starter connector 22 is held onto the power terminal 226 of the starter motor 208 in electrical contact therewith by a nut 232 that is threadably engaged with the power terminal 226.

Thus, in accordance with the present invention and as shown in FIG. 2, the power switch 20 is connected in electrical series in the starting current power line between the battery 206 and the starter motor 208. Consequently, in the present invention the starter motor cannot receive current from the battery 206, even when the starter switch 218 of the vehicle 200 is closed, unless the power switch 20 is also closed. Furthermore, as described below, the power switch 20 closes to complete the electrical circuit between the battery 206 and starter motor 208 only when a control circuit 24 in the housing 12 receives an enable signal from an enable signal generator 26 (FIG. 1).

Advantageously, the enable signal generator 26 is a hand-held (and thus portable) manipulable device which can be conveniently coupled to the key 204. In one embodiment, the generator 26 is a radiofrequency (rf) amplitude modulated (AM) transmitter model no. TX-99K, made by Ming, or a transmitter made by Place. When appropriately manipulated, the generator 26 broadcasts a coded enable signal to the control circuit 24 to close the power switch 20. If desired, the control circuit 24 can be "trained" to accept the code of a preexisting rf transmitter that is concurrently used for, e.g., remotely opening the door locks of the vehicle 200 as a person approaches the vehicle 200.

FIG. 3 shows the details of one control circuit 24, it being understood that FIGS. 11–14 show an alternate circuit of the present invention. As shown, a voltage regulator 28 is connected in parallel with the battery 206. The regulator 28 includes a twelve volt power output port $+V_o$ that is connected to a control circuit power line $L_p$. Also, the regulator 28 includes a ground port $-V_o$ that is connected to a control circuit ground line $L_g$ having an isolated ground G1. In accordance with the present invention, the regulator 28 maintains a constant voltage in the control circuit 24 while the power switch 20 is closed and the engine 210 is cranking during start-up. In one embodiment, the voltage regulator 28 is a type 4007 12 volt power module made by Burr-Brown.

As shown in FIG. 3, an input capacitor C1 is connected in parallel with the battery 206 and the input ports of the regulator 28. Also, an output capacitor C2 is connected in parallel with the output port +V$_o$ and ground port -V$_o$ of the regulator 28. Example values of the resistors and capacitors of the present invention are set forth in Table 1 below.

An enable signal receiver 30 is connected to the power line L$_p$. In one embodiment, the receiver 30 is a type RE-99 receiver made by Ming. More preferably, the present receiver is a type KESRX01 receiver made by Plessey operating at three hundred fifteen million Hertz (315 MHz). In accordance with the present invention, the receiver 30 receives the enable signal from the enable signal generator 26 (FIG. 1), and in response sends a control signal to a timer 32 via a control signal line L$_c$.

The timer 32 can be a chip trigger timer, and more specifically a type 556 dual timer made by, e.g., National Semiconductor. Accordingly, the skilled artisan will recognize that the timer 32 receives a relatively short duration control signal from the receiver 30 and outputs a relatively longer duration output pulse at first and second output ports T$_{out}^1$ and T$_{out}^2$.

As shown in FIG. 3, the timer 32 is connected to the ground line L$_g$ via a timer regulator line L$_{tr}$ and a capacitor C3. Additionally, the timer 32 is connected to a first time delay capacitor C4 as shown, and the first time delay capacitor C4 is connected to the timer regulator line L$_{tr}$ via two resistors R1, R2. A second time delay capacitor C5 is connected between the timer 32 and ground in parallel with the first time delay capacitor C4. Moreover, as shown a ground port GND of the timer 32 is connected directly to ground, while a power port PWR of the timer 32 is connected to the power line L$_p$. In the embodiment shown, a resistor R3 is connected between the power line L$_p$ and the control signal line L$_c$.

As intended by the present invention, the timer 32 in combination with the time delay capacitors C4, C5 resistors R1, R2 establishes a time delay circuit that defines a predetermined enable period, during which period the power switch 20 is closed as further disclosed below. In one embodiment, the predetermined enable period is about one minute in length. Additionally, the receiver 30 with resistor R3 establishes a trigger circuit for triggering the timer 32 to output voltages at the output ports T$_{out}^1$ and T$_{out}^2$. It is accordingly to be understood that the output voltages are generated at T$_{out}^1$ and T$_{out}^2$ only during the entire enable period.

Continuing with the description of the control circuit 24 shown in FIG. 3, the first output port T$_{out}^1$ is connected to the base of a type 2N2222 alarm transistor Q1 via a resistor R4. In turn, the collector of the alarm transistor Q1 is connected to an audible alarm 34. A type 1N4001 protect diode D1 is connected in parallel to the alarm 34 as shown. In one presently embodiment, the alarm 34 is a piezoelectric beeper that emits a beeping sound during the predetermined enable period. As shown, the alarm 34 is connected to the power line L$_p$ via an alarm line L$_a$, with the emitter of the alarm transistor Q1 being connected to ground.

FIG. 3 also shows that the second output port T$_{out}^2$ is connected to the base of a type 2N2222 driver transistor Q2 via a resistor R5. In turn, the collector of the driver transistor Q2 is connected to the base of a type 2N2222 power switch Q3 via a resistor R6. As also shown, the collector of the driver transistor Q2 is connected to the power line L$_p$ via a resistor R7, and the collector of the power switch transistor Q3 is connected to the power line L$_p$ as well, with a resistor R8 separating the connections of the transistors Q2, Q3, to the power line L$_p$. The emitters of both the driver transistor Q2 and power switch transistor Q3 are connected to ground as shown. In the circuit shown, an RC circuit including a capacitor C6 and resistor R9 is connected between ground and the power line L$_p$.

As shown in FIG. 3, the power switch 20 is connected to the power line L$_p$ between the resistor R8 and the RC circuit established by the capacitor C6 and resistor R9 for controlling the power switch 20. The power switch 20 can be a solid state power switch, such as a field effect transistor, bipolar transistor, or silicon controller rectifier (SCR). As recognized by the present invention, by making the power switch 20 an SCR, repeated reliable cycling of the power switch 20 is facilitated, notwithstanding the fact that it must pass the relatively high current in the starting current power line 220.

With the above disclosure in mind, the operation of the antitheft system 10 can be appreciated. A person can manipulate the enable signal generator 26 (FIG. 1) to generate an enable signal. The enable signal receiver 30 (FIG. 3) receives the signal and triggers the timer 32 to output voltages at its output ports T$_{out}^1$ and T$_{out}^2$ for the predetermined enable period defined by the time delay circuit described above.

In response to the output signal at the first output port T$_{out}^1$, the alarm transistor Q1 causes the alarm 34 to beep, indicating that the ignition system of the vehicle 200 is enabled. Simultaneously, in response to the output signal at the second output port T$_{out}^2$, the driver transistor Q2 and power switch transistor Q3 send a control signal to the power switch 20 to cause it to close.

While the power switch 20 is closed during the predetermined period, the ignition system of the vehicle 200 is enabled. Consequently, a person can engage the key 204 with the ignition switch 202 and start the engine 210 by turning the key 204. On the other hand, in the absence of an enable signal or after the predetermined period has elapsed, manipulation of the key 204 cannot start the vehicle 200, because the electrical path between the battery 206 and starter motor 208 is interrupted by the open power switch 20.

TABLE 1

| Component | Value (farads/ohms) |
| --- | --- |
| C1 | 10 μF |
| C2 | 10 μF |
| C3 | 47 μF |
| C4 | 47 μF |
| C5 | 10 μF |
| C6 | .01 μF |
| R1 | 1.1 MΩ |
| R2 | 180 KΩ |
| R3 | 10 KΩ |
| R4 | 470 Ω |
| R5 | 470 Ω |
| R6 | 240 Ω |
| R7 | 240 Ω |
| R8 | 75 Ω |
| R9 | 1 KΩ |

Figure 5A:
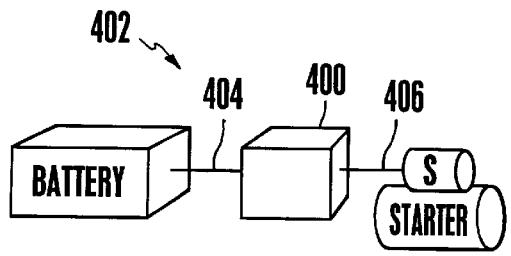
FIG. 5A is a schematic diagram showing the cooperation of structure between the housing of the present invention and a vehicular starting current arrangement in which a starter motor has a solenoid combined integrally therewith.
Figure 5B:
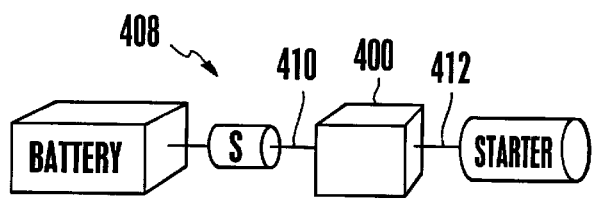
FIG. 5B is a schematic diagram showing the cooperation of structure between the housing of the present invention and a vehicular starting current arrangement in which a starter motor is physically distanced from its associated solenoid.

As mentioned above and as shown in greater detail in reference to FIGS. 5A and 5B, an antitheft system, generally designated 400, for holding the power switch and accompanying circuitry of the present invention can be suspended between and thereby supported by a battery power line and a starter motor power line. This support can be exclusive, or in addition to other support means, e.g., brackets and the like. The antitheft system 400 is in all essential respects identical to the system 10 shown in FIGS. 1–3, with the exceptions noted below.

In the embodiment shown in FIG. 5A, a starting current power line, generally designated 402, which is in all essential respects identical to the starting current power line 220 shown in FIG. 1, can be cut near (i.e., within a few inches of) a starter motor "STARTER" having a solenoid "S" combined integrally therewith to establish a battery power line 404 and a starter motor power line 406. It will be appreciated that the starter motor power line 406 is electrically connected to the starter motor windings via the starter switch of the solenoid "S", and the starter motor power line is coupled to the housing. Also, the battery power line 404 is electrically connected to a battery "BATTERY" and mechanically coupled to the system 400, such that the system 400 is supported only by the power lines 404, 406.

In some vehicles, the solenoid "S" is not physically combined with the starter motor, but the above-disclosed combination of structure can nevertheless be used. FIG. 5B shows schematically shows such a vehicle, wherein a starting current power line, generally designated 408, is cut between a solenoid "S" and a starter motor "START" to establish a battery power line 410 and a starter motor power line 412. It will be appreciated that the starter motor power line 412 is electrically connected to the starter motor windings, and the starter motor power line 412 is coupled to the housing. Also, the battery power line 410 is electrically connected to a battery "BATTERY" via the starter switch of the solenoid "S" and is mechanically coupled to the system 400, such that the system 400 is supported only by the power lines 410, 412.

Figure 6:
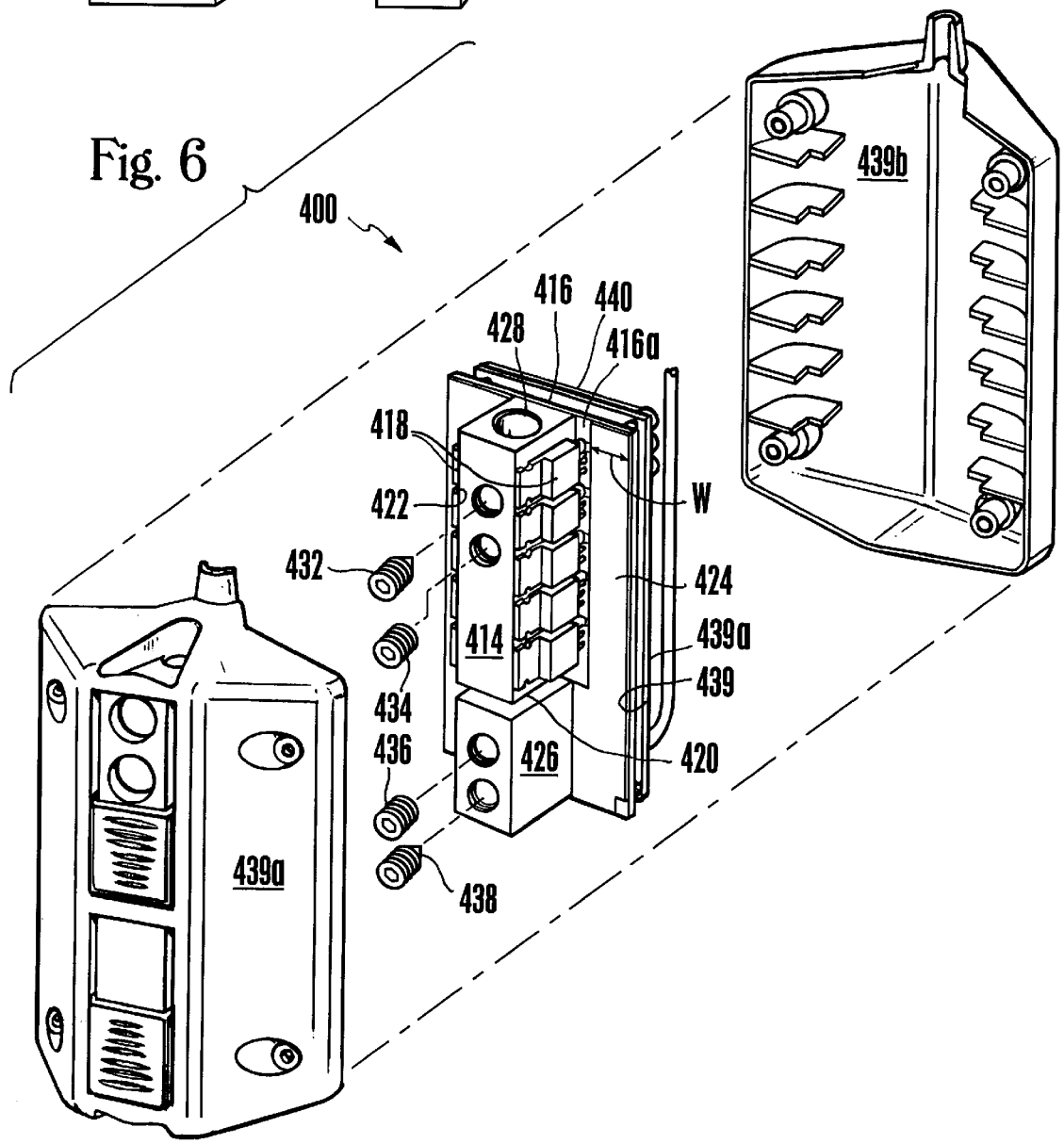
FIG. 6 is an exploded perspective view of the housing shown schematically in FIGS. 5A and 5B.

Now referring to FIG. 6, the details of the system 400 schematically shown in FIGS. 5A and 5B, can be seen. An elongated, parallelepiped-shaped copper or copper-alloy input bus bar 414 is attached to a first flat, parallelepiped-shaped, electrically insulative circuit board 416 at a first surface 416*a* of the circuit board 416. Plural type TO220 or type IRL3705N MOSFETs 418 are soldered to or otherwise held against the input bus bar 414 in electrical contact therewith. In the preferred embodiment, five MOSFETs 418 are soldered to a first long vertical side 420 of the input bus bar 414, and five MOSFETs 418 are soldered to a second long vertical side 422 of the input bus bar 414, it being readily understood in reference to FIG. 6 that the first long side 420 is opposed to the second long side 422.

In turn, the MOSFETs 418 are in electrical contact with, and preferably in direct physical contact with, a flat, U-shaped, relatively wide (e.g., about five to ten millimeters in width "W"), electrically conductive trace 424 that is embedded in the first circuit board 416 near the first surface 416*a*. Moreover, the trace 424 is electrically connected to and is preferably in physical contact with a copper or copper-alloy parallelepiped-shaped output bus bar 426. Preferably, the trace 424 is made of copper having a thickness of about fourteen thousandths of an inch (0.014"). The skilled artisan will recognize that the trace 424 has a thickness about ten times normal, to enable the trace 424 to carry high starting current.

As shown in FIG. 6, the input bus bar 414 is formed with a central battery channel 428 that is parallel to the sides 420, 422 of the bus bar 414. Also, the output bus bar 426 is formed with a central starter motor channel (not shown in. FIG. 6) that is generally colinear with the battery channel 428.

Per the present invention, either one of the battery power lines 404, 410 shown in FIGS. 5A and 5B is advanced into the battery channel 428 in electrical contact therewith. Then, two input set screws 432, 434 that are oriented perpendicular to the battery channel 428 and that are threadably engaged with the input bus bar 414 are tightened against the battery power line. In the preferred embodiment, one of the input set screws 432, 434 has a relatively blunt end for crushing the conductor in the power line to promote electrical contact therebetween, and the other input set screw 434, 432 has a relatively pointed end for piercing the insulation of the battery power line and thereby firmly holding the power line in the battery channel 428. Similarly, either one of the starter motor power lines 406, 412 shown in FIGS. 5A and 5B is advanced into the starter motor channel in electrical contact therewith. Then, two output set screws 436, 438 that are oriented perpendicular to the channel and that are threadably engaged with the output bus bar 426 are tightened against the starter motor power line. In the preferred embodiment, one of the output set screws 436, 438 has a relatively blunt end, and the other output set screw 438, 436 has a relatively pointed end for piercing the insulation of the starter motor power line and thereby firmly holding the power line in the starter motor channel and, hence, holding the device 400 in suspension between the battery power line and starter motor power line. Prevailing torque compound can be deposited on the screws 432, 434, 436, 438 to prevent the screws from loosening under vibratory loads.

With the above disclosure in mind, the system 400 shown in FIG. 6 incorporates a solid state power switch that is established by the MOSFETs 418, for selectively connecting either one of the batteries shown in FIGS. 5A and 5B with the windings of the associated starter motor. As intended by the present invention, the circuit board 416 is separated from a second circuit board 439 by an air gap, with the second circuit board 439 defining a second surface 439 *a* that is opposite the first surface 416*a*.

The distance between the first and second surfaces 416*a*, 439*a* is about five millimeters (5 mm). Electronic control circuitry for controlling the power switch is mounted on the second surface 439*a*, such that the electronic circuitry is sufficiently insulated from the relatively high amperage in the trace 424, near the first surface 416*a*. This electronic circuitry can be substantially identical to the circuitry shown in FIG. 2, or it can be the circuitry shown in FIGS. 11–15. Moreover, to further shield the logic circuits on the second surface 439*a* from the effects of the high current in the bus bars, a ground plane 440 can cover the second surface 439*a*. The circuit boards 416, 439 with associated structure described above are enclosed in a plastic housing having first and second halves 439*a*, 439*b* that can be engaged with each other using threaded fasteners or that can be otherwise sealed together.

Figure 7:
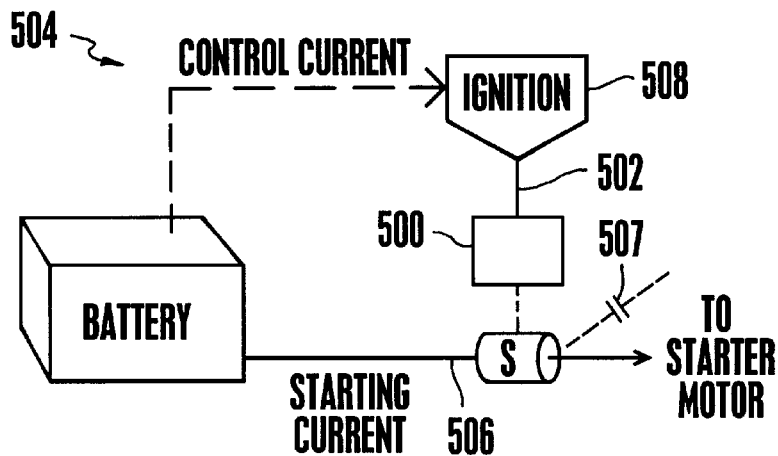
FIG. 7 is a schematic view of the present antitheft device incorporated in the control current line of a starter solenoid, showing the control current line in phantom.
Figure 8:
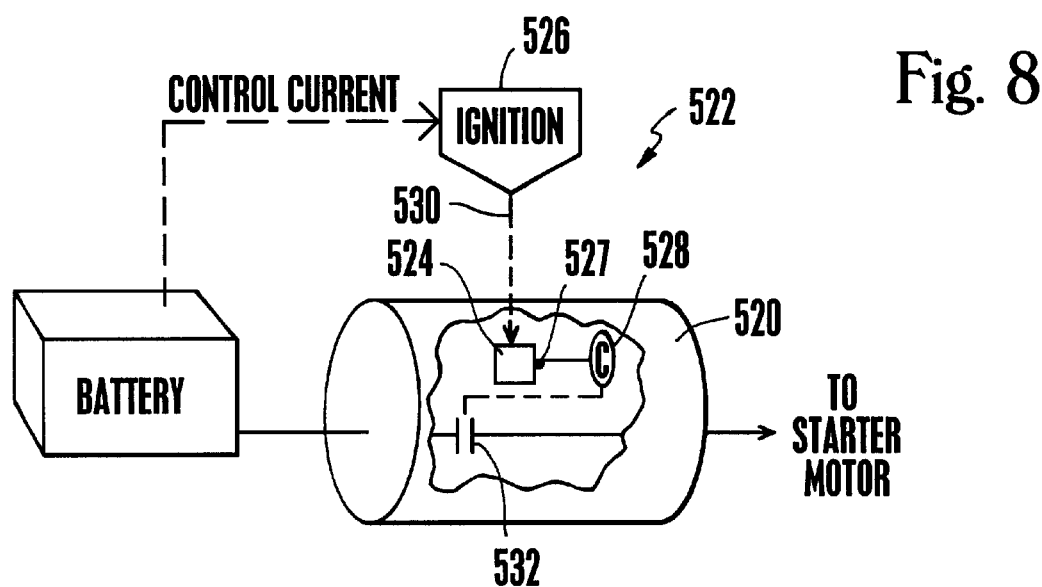
FIG. 8 is a schematic view of the present antitheft device incorporated in the starter solenoid housing, showing the control current line in phantom.

FIGS. 7 and 8 show that instead of incorporating the present vehicle antitheft device in the starting current power line of a vehicle, it may instead be installed in the control current power line of a starter solenoid, either externally to the solenoid housing (FIG. 7) or internally to the solenoid housing (FIG. 8). With respect to FIG. 7, an antitheft device 500 is installed in series with and supported by a solenoid control current power line 502 in a vehicle, generally designated 504. The vehicle 504 includes a battery as shown that sends high amperage (2000 or so amperes) to a starter motor via a starting current power line 506 and a starter solenoid "S", when the starter solenoid "S" has been energized to close a solenoid contact 507 in response to an ignition signal from the ignition 508 of the vehicle 504.

It is to be understood that the antitheft device 500 shown in FIG. 7, is in all essential respects identical in operation to the antitheft device 400 shown in FIG. 6, with the exception that only a single MOSFET need be used as the power switch, owing to the relatively low amperage of the control current vis-a-vis the starting current. Also, the input and output busses of the device 500 shown in FIG. 7 need not be as heavy duty as the busses shown in FIG. 6, again owing to the relatively low amperage of the starter solenoid control current. Indeed, the input and output busses can be connectors defining channels and having retainers for holding wire in the channels. Thus, with the present invention, the antitheft device 500 must receive an authorized enable signal to close its power switch, to permit operation of the ignition 508 to start the vehicle. In the absence of an enable signal, operation of the ignition 508 will not start the vehicle, because no control current can flow to the solenoid "S".

FIG. 8 shows that the present antitheft device can be incorporated into a starter solenoid housing 520 of a vehicle, generally designated 522. More particularly, an antitheft device 524 that is in all essential respects identical in operation to the antitheft device 500 shown in FIG. 7 is positioned in the solenoid housing 520 in electrical series between an ignition 526 of the vehicle 522 and an input terminal 527 of an activating coil 528 in the solenoid housing 520. In accordance with well-known means, the activating coil 528, when energized by control current from a vehicle battery via a control current power line 530 in response to the ignition 526, closes a solenoid contact 532 to thereby complete an electrical path from the battery to the starter motor of the vehicle 522. As can be appreciated in reference to FIG. 8, with the present invention, the antitheft device 524 must receive an authorized enable signal to close its power switch, to permit operation of the ignition 526 to start the vehicle. In the absence of an enable signal, a path for electrical communication to the coil 528 does not exist; hence, no control current can energize the coil 528 and, thus, the solenoid contact 532 will remain open.

In addition to the above inventive structure, the present invention permits a user to tailor any one of the antitheft devices disclosed herein to operate in response to a user-selected enable signal generator. Accordingly, the present invention can incorporate a computer program device, such as, e.g., an application specific integrated circuit or other logic device that can be associated with the present control circuit, to "train" the antitheft device to actuate upon receipt of one of a plurality of user-defined enable signal codes. The computer program may be executed by a processor, such as one or both of the processors shown below in FIG. 13, within the control circuit as a series of computer-executable instructions. These instructions may reside, for example, in RAM or ROM. Alternatively, the instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C or C$^{++}$compatible code, or appropriate machine code.

Figure 10:
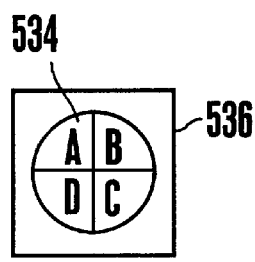
FIG. 10 is a schematic rendering of a computer program device.
Figure 9:
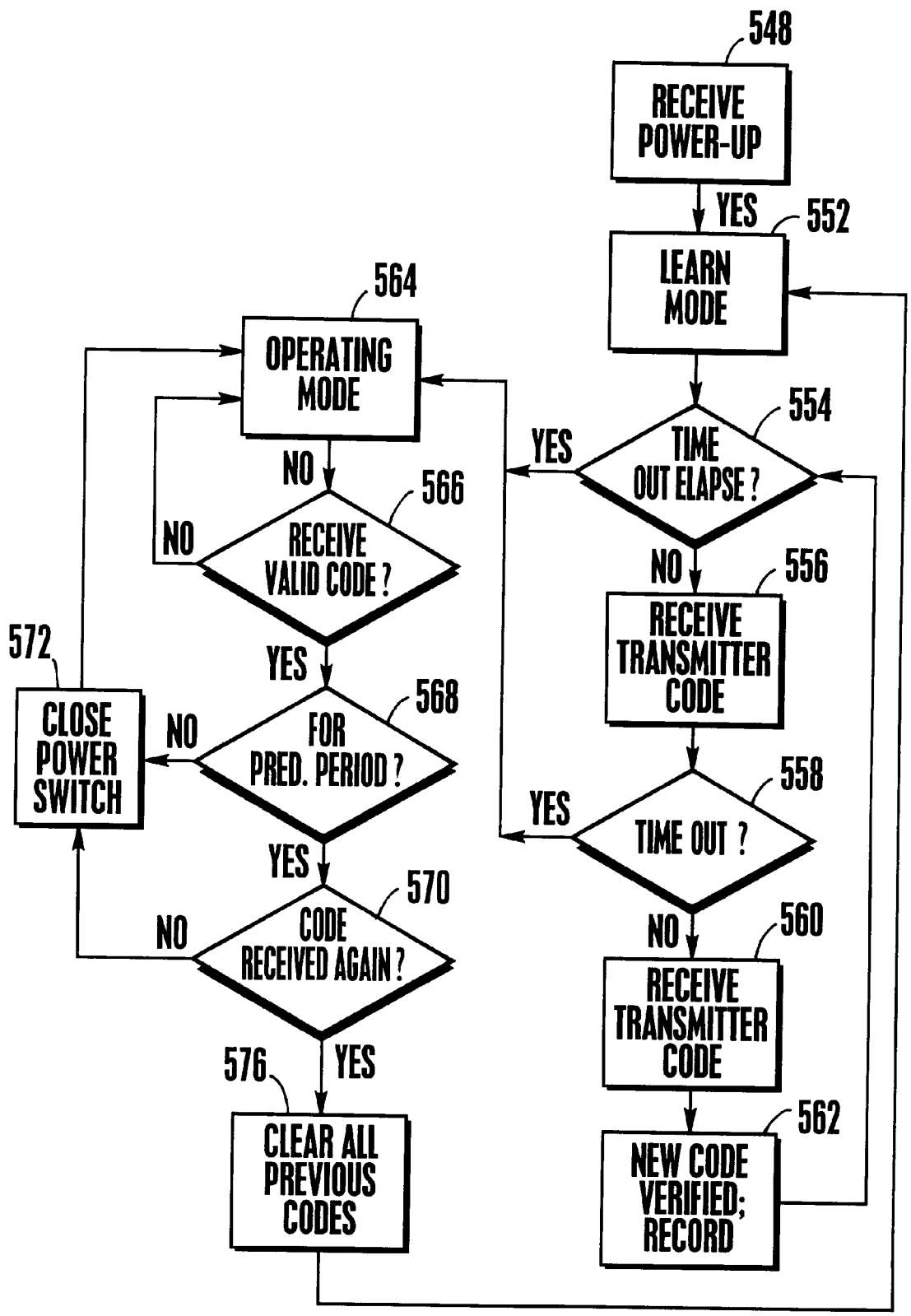
FIG. 9 is a flow chart showing the logic of the present invention is programming the control circuit to receive one of a plurality of user-selected transmitter signals.

FIG. 9 illustrates the structure of such instructions as embodied in a computer program. Those skilled in the art will appreciate that FIG. 9 illustrates the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 10 as a combination of program code elements A-D in computer readable form that are embodied in a computer-usable data medium 534, on a computer diskette 536. As mentioned above, however, such media can also be found in semiconductor devices, on magnetic tape, and on optical disks.

Commencing at block 548 of FIG. 9, the device is connected as discussed above to a power source, preferably a vehicle battery. The logic then moves to block 552, wherein the device enters a learn mode. In an alternate embodiment, the logic can determine whether the power up is the initial power up, and permit entering the learn mode at block 552 only when the power up is the initial power up or upon reception of a previously authorized code, as an added measure of security.

In the learn mode, a user can generate one or more enable signal codes from one or more enable signal generators that the user might want to use to operate the present antitheft system. After entering the learn mode, a timer is started and, if it is determined at decision diamond 554 that a predetermined time out period has not elapsed, a transmitter code is received at block 556 as a proposed enable signal. To designate the proposed enable signal as an authorized enable code, the proposed enable signal must be received a second time within ;a predetermined time out period. Thus, after the first receipt of a proposed enable signal, program control continues to decision diamond 558, wherein it is determined whether another predetermined time our period has elapsed. When a second transmission of a proposed enable signal is received within the time out period, the process moves to block 560 to receive the second transmission and then record the proposed enable signal as a verified, authorized enable code at block 562. The process then loops back to decision diamond 554 to record additional enable codes, if desired, or to time out and exit the learn mode. It is to be understood that as mentioned above, during the first entry of the learn mode, a bit can be set indicating that the device has experienced an initial power up, if desired, as an added measure of security. As shown in FIG. 9, when the device times out of the learn mode from decision diamonds, 554, 558, the device enters the operating mode at block 564.

From block 564, program control resumes at decision diamond 566 wherein it is determined whether a valid (i.e., authorized) enable code has been received. When such an authorized code has been received, program control resumes at decision diamond 568 to determine whether the code has been received continuously for a predetermined period, i.e., whether the user has evinced a desire to enter the learn mode by continuously depressing the transmitter button or key. When the test at decision diamond 568 is positive, the logic moves to decision diamond 570 to determine whether the code has been received again within a predetermined time out period, as verification that the user wants to enter the learn mode. It is to be understood that light emitting diodes (LEDs) can be mounted on the device 400 and illuminated periodically to present a visual signal that the logic has received the first signal at decision diamond 568. Once the second (verification) signal is received at decision diamond 570, the LEDs can be illuminated continuously to indicate entry into the learn mode.

If the user did not depress the transmitter key sufficiently long to achieve a positive test at decision diamond 568, or if the user did not key the transmitter a second time to verify entering the learn mode at decision diamond 570, the logic proceeds to block 572 to close the power switch, and then the logic moves back to block 564. On the other hand, if the verification is determined as being received at decision diamond 570, the logic moves to block 576 to clear all previous codes, and then the logic moves to the learn mode at block 552.

FIGS. 11–15 are schematic diagrams of the circuitry of the device 400 shown in FIG. 6. It is to be understood that the components shown in FIGS. 11–15 can be physically mounted on the second circuit board 439 shown in FIG. 6. It is to be further understood that FIGS. 11–15 use conventional symbols to depict the various circuit components, with the circuit components being generically labelled as appropriate and shown with accompanying preferred component values. Also, manufacturers names are shown in parentheses in FIGS. 11–15 where appropriate, adjacent the component corresponding to the manufacturer, as are manufacturer part numbers. Values of resistors are given in Ohms and values of capacitors are given in microFarads unless otherwise noted.

FIG. 11 shows the circuitry of the MOSFETs 418 shown in FIG. 6. In FIG. 11, the MOSFETs 418 are labelled Q1–Q10, and are shown electrically connected to the trace 424. A snubber circuit 580 can be provided as shown in accordance with well-known principles.

Figure 14:
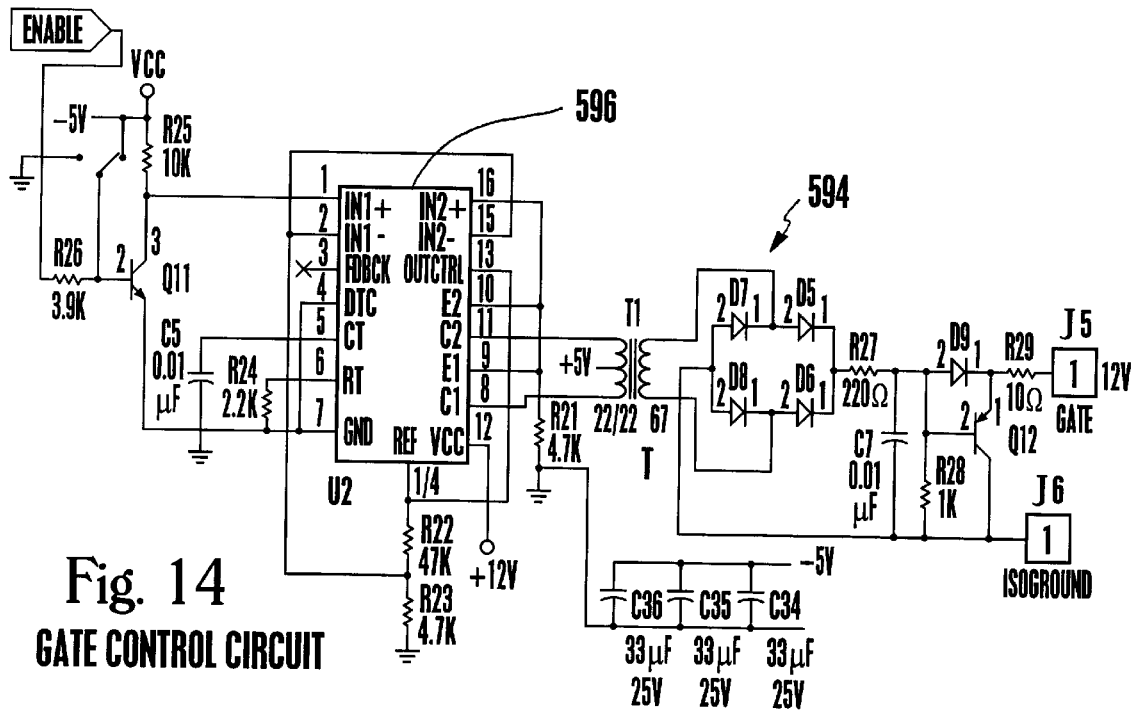
FIG. 14 is an electrical schematic diagram of the gate control circuit for the device shown in FIG. 6.

FIG. 12 shows an exemplary power supply circuit 582 that can be used to provide five volt dc (5 vdc) voltage $V_{cc}$ to the circuitry shown in FIGS. 13 and 14. Like the circuit shown in FIG. 3, the circuit shown in FIG. 12 can include a voltage regulator 584, preferably a type MIC2954-03BS regulator made by Micrel, to ensure that the control circuitry discussed below is supplied a constant five volts stepped down from the vehicle battery that is connected at the junction labelled "J1" in FIG. 12.

FIG. 13 shows an exemplary control circuit 586 that includes a master microprocessor 588 which controls a slave microprocessor 590 in response to, among other things, signals received at a junction labelled "RXDATA" in FIG. 13. The microprocessors 588, 590 respectively can be a type PIC12C509 microchip and a type HCS512-I/SO microchip that operate in accordance with the logic shown in FIG. 9 to control the device 400 shown in FIG. 6. It is to be understood that the present rf receiver (e.g., the receiver 30 discussed above) is connected to the junction "RXADATA", and the control circuit 586 outputs control signals to the gate control circuit shown in FIG. 14 at a junction labelled "ENABLE" in FIG. 13 in accordance with the principles discussed above. The control circuit 586 includes a timer 592 as shown, preferably a type ICM7555ID timer made by Phillips Electronics Corp.

FIG. 14 shows an exemplary gate control circuit 594 that receives signals from the control circuit 586 shown in FIG. 13 at the junction labelled "ENABLE" for controlling the gates of the MOSFETs 418 shown in FIGS. 6 and 11. As shown, the gate control circuit 594 includes a feedback outcontrol chip 596 made, in one preferred embodiment, by Texas Instruments under the part number TL494ID.

Figure 15:
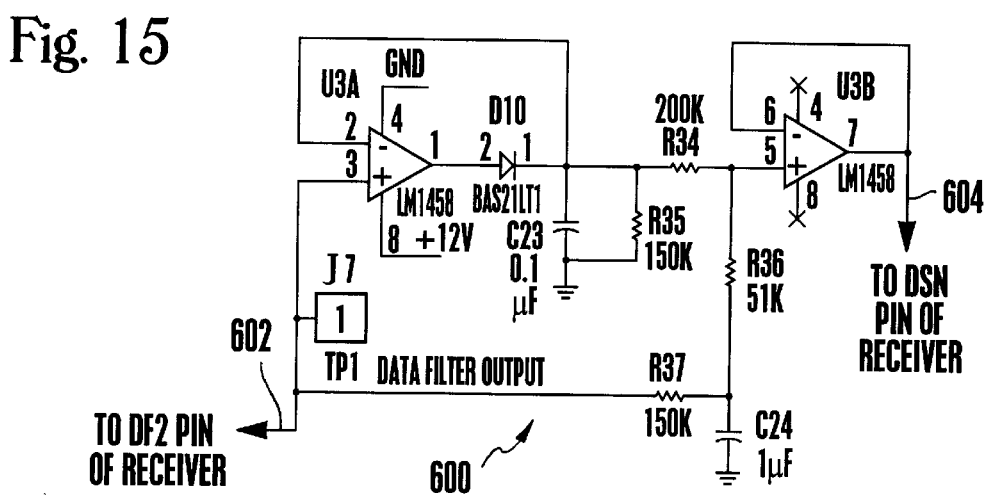
FIG. 15 is an electrical schematic diagram of the receiver filter and adaptive slicer circuit.

FIG. 15 shows a noise suppression and adaptive slicer circuit 600 that includes a two-stage operational amplifier as shown, and various noise suppression elements as shown, for increasing the operational range of the preferred receiver 30. A first lead 602 of the noise suppression and adaptive slicer circuit 600 is connected to the DF2 pin (pin #22) of the preferred Plessey receiver, and a second lead 604 of the noise suppression and adaptive slicer circuit 600 is connected to the DSN pin (pin #10) of the preferred Plessey receiver.

While the particular ANTITHEFT INTERRUPT SYSTEM FOR VEHICLE STARTER POWER CIRCUIT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. An antitheft device for a vehicle including a battery, a starter motor including windings, and a starting current power line establishing at least a portion of an electrically conductive path between the battery and the starter motor windings, comprising:

a housing supported by the starting current power line; and a power switch in the housing in series with the electrically conductive path, the power switch closing in response to an enable signal.

2. The device of claim 1, wherein the power switch is at least one MOSFET, and the device further comprises:

an electrically conductive input bus bar internal to the housing in electrical contact with the at least one MOSFET, the input bus bar being formed with an input channel for receiving an input segment of the power line therein, the input segment being associated with the battery.

3. The device of claim 2, further comprising at least one input retaining screw engaged with the input bus bar for protruding into the input channel to thereby hold the input segment in the input channel.

4. The device of claim 3, further comprising:

an electrically conductive output bus bar internal to the housing in electrical communication with the at least one MOSFET, the output bus bar being formed with an output channel for receiving an output segment of the power line therein, wherein the output segment is associated with the starter motor windings; and at least one output retaining screw engaged with the output bus bar for protruding into the output channel to thereby hold the output segment in the output channel.

5. The device of claim 4, further comprising:

an electrically conductive trace in electrical contact with the at least one MOSFET and the output bus bar.

6. The device of claim 5, further comprising two input screws, at least one of which is configured for piercing electrical insulation.

7. The device of claim 5, further comprising a portable enable signal generator for generating the enable signal.

8. The device of claim 5, further comprising:

a receiver for receiving the enable signal, the receiver defining an operational range.

9. The device of claim 8, in combination with the vehicle.

10. The device of claim 3, wherein the at least one input retaining screw is pointed.

11. The device of claim 1, further comprising a computer program device, comprising:

a computer program storage device readable by a digital processing apparatus; and a program means on the program storage device and including instructions executable by the digital processing apparatus for performing method steps for operating the power switch of the vehicle antitheft device in response to the enable signal, the method steps comprising:
(a) upon energization of the antitheft device:
(a1) receiving at least one enable code from an enable code generator;
(b) upon subsequent receipt of the at least one enable code within a predetermined time period, recording the at least one enable code as an authorized enable signal; and
(c) closing the power switch upon subsequent receipt of an authorized enable signal.

12. A method for electrically connecting a battery to a starter motor of a motor vehicle having a starting current power line, comprising:
disposing a power switch in a housing;
cutting the starting current power line to establish an input segment and an output segment;
advancing the segments into the housing to support the housing, the segments being in electrical contact with the power switch; and
transmitting an enable signal to cause the power switch to close.

13. The method of claim 12, wherein the power switch is at least one MOSFET, and the housing includes:
an electrically conductive input bus bar in electrical contact with the at least one MOSFET, the input bus bar being formed with an input channel for receiving the input segment therein;
at least one input retaining screw engaged with the input bus bar and protruding into the input channel to thereby hold the input segment in the input channel;
an electrically conductive output bus bar in electrical communication with the at least one MOSFET, the output bus bar being formed with an output channel for receiving the output segment therein; and
an electrically conductive trace in electrical contact with the at least one MOSFET and the output bus bar.

14. A computer program device comprising:
a computer program storage device readable by a digital processing apparatus; and
a program means on the program storage device and including instructions executable by the digital processing apparatus for performing method steps for operating a power switch in a vehicle antitheft device in response to an enable signal, the method steps comprising:
(a) upon energization of the antitheft device:
(a1) receiving at least one enable code from an enable code generator;
(b) upon subsequent receipt of the at least one enable code within a predetermined time period, recording the at least one enable code as an authorized enable signal; and
(c) closing the power switch upon subsequent receipt of an authorized enable signal.

15. The computer program device of claim 14, in combination with the antitheft device.

16. The antitheft device of claim 15, in combination with the vehicle.

17. An antitheft device for a vehicle including an ignition switch, a battery, a starter motor, a starter solenoid for establishing a pathway for starting current from the battery to the starter motor when the ignition switch is closed, and a control power line connected to the starter solenoid, comprising:

a housing supported by the control power line; and
a power switch in the housing, the power switch being in series with the control power line and responsive to an enable signal to selectively close.

18. The device of claim 17, wherein the power switch is at least one MOSFET, and the device further comprises:
an electrically conductive input connector internal to the housing in electrical contact with the at least one MOSFET, the input connector being formed with an input channel for receiving an input segment of the control power line therein.

19. The device of claim 18, further comprising at least one input retainer engaged with the input connector to hold the input segment in the input channel.

20. The device of claim 19, further comprising:
an electrically conductive output connector internal to the housing in electrical communication with the at least one MOSFET, the output connector being formed with an output channel for receiving an output segment of the control power line therein; and
at least one output retainer engaged with the output connector to hold the output segment in the output channel.

21. The device of claim 20, further comprising an electrical trace interconnecting the MOSFET to the connectors.

22. The device of claim 17, further comprising a portable enable signal generator for generating the enable signal.

23. The device of claim 17, further comprising:
a receiver for receiving the enable signal, the receiver defining an operational range.

24. The device of claim 17, in combination with the vehicle.

25. The device of claim 17, further comprising a computer program device, comprising:
a computer program storage device readable by a digital processing apparatus; and
a program means on the program storage device and including instructions executable by the digital processing apparatus for performing method steps for operating the power switch in response to the enable signal, the method steps comprising:
(a) upon energization of the antitheft device:
(a1) receiving at least one enable code from an enable code generator;
(b) upon subsequent receipt of the at least one enable code within a predetermined time period, recording the at least one enable code as an authorized enable signal; and
(c) closing the power switch upon subsequent receipt of an authorized enable signal.

26. A starter solenoid, comprising:
a solenoid housing;
an activating coil in the housing, the activating coil having an input terminal for receiving control current thereat;
a solenoid contact operable by the activating coil;
at least one MOSFET in electrical series with the input terminal of the activating coil and disposed in the solenoid housing for actuating the solenoid upon receipt of an enable signal, and
a logic device embodying instructions for performing method steps for operating the MOSFET in response to the enable signal, the method steps comprising:
(a) upon energization of the antitheft device:
(a1) receiving at least one enable code from an enable code generator;

(b) upon subsequent receipt of the at least one enable code within a predetermined time period, recording the at least one enable code as an authorized enable signal; and (c) closing the MOSFET upon subsequent receipt of an authorized enable signal.

27. The starter solenoid of claim 26, further comprising a portable enable signal generator for generating the enable signal.

28. The starter solenoid of claim 26, in combination with the vehicle.

29. The starter solenoid of claim 26, further comprising a time delay circuit connected to MOSFET for causing the MOSFET to assume an open configuration after the elapse of a predetermined time period from receipt of the enable signal.

30. The starter solenoid of claim 26, further comprising a voltage regulating circuit electrically connected to the MOSFET.

31. The starter solenoid of claim 26, further comprising:

a time delay circuit connected to the MOSFET for causing the MOSFET to assume an open configuration after the elapse of a predetermined time period from receipt of the enable signal; and a voltage regulating circuit electrically connected to the MOSFET.

32. A starter solenoid, comprising:

a solenoid housing, the solenoid housing not containing a starter motor;

an activating coil in the housing, the activating coil having an input terminal for receiving control current thereat for actuating a starter motor located outside the solenoid housing;

a solenoid contact operable by the activating coil;

at least one power switch in electrical series with the input terminal of the activating coil for actuating the solenoid upon receipt of an enable signal, the power switch being disposed in the solenoid housing;

a time delay circuit connected to the power switch for causing the power switch to assume an open configuration after the elapse of a predetermined time period from receipt of the enable signal, and a logic device embodying instructions for performing method steps for operating the power switch in response to the enable signal, the method steps comprising:

(a) upon energization of the antitheft device:
(a1) receiving at least one enable code from an enable code generator;

(b) upon subsequent receipt of the at least one enable code within a predetermined time period, recording the at least one enable code as an authorized enable signal; and (c) closing the power switch upon subsequent receipt of an authorized enable signal.

33. The starter solenoid of claim 32, wherein the power switch is a MOSFET, and the solenoid further comprises a voltage regulating circuit electrically connected to the MOSFET.

34. A starter solenoid, comprising:

a solenoid housing;

an activating coil in the housing, the activating coil having an input terminal for receiving control current thereat;

a solenoid contact operable by the activating coil;

at least one power switch in electrical series with the input terminal of the activating coil for actuating the solenoid upon receipt of an enable signal, the power switch being disposed in the solenoid housing;

a voltage regulating circuit electrically connected to the power switch; and a logic device embodying instructions for performing method steps for operating the power switch in response to the enable signal, the method steps comprising:

(a) upon energization of the antitheft device:
(a1) receiving at least one enable code from an enable code generator;

(b) upon subsequent receipt of the at least one enable code within a predetermined time period, recording the at least one enable code as an authorized enable signal; and (c) closing the power switch upon subsequent receipt of an authorized enable signal.

35. The starter solenoid of claim 34, wherein the power switch is a MOSFET, and the solenoid further comprises a time delay circuit connected to the MOSFET for causing the MOSFET to assume an open configuration after the elapse of a predetermined time period from receipt of the enable signal.

* * * * *